April 10, 1934.    A. J. DOTTERWEICH    1,954,405
WATER SOFTENING APPARATUS
Filed Jan. 19, 1924    3 Sheets-Sheet 1

April 10, 1934.  A. J. DOTTERWEICH  1,954,405
WATER SOFTENING APPARATUS
Filed Jan. 19, 1924   3 Sheets-Sheet 3

Patented Apr. 10, 1934

1,954,405

UNITED STATES PATENT OFFICE 1,954,405

WATER-SOFTENING APPARATUS

Andrew J. Dotterweich, Pittsburgh, Pa., assignor, by mesne assignments, to General Water Treatment Corporation, New York, N. Y., a corporation of Delaware Application January 19, 1924, Serial No. 687,340

52 Claims. (Cl. 210—24)

The invention described and claimed herein relates to apparatus for softening water and especially to that type employing a material such as zeolite, capable of being regenerated. The invention has for its object the provision of means whereby the several operations of softening, removing foreign matter from the softening material, regenerating the zeolite, and washing or cleaning subsequent to regenerating, and renewal of the softening operation are performed in due sequence.

Another object of the invention is the provision of a control mechanism embodying a system of pilot valves for operating the control valves of the water softening system by means of which the proper sequence of operations is automatically effected.

Another object of the invention is the provision of an electrical control system for the operating mechanism which is responsive to the relative conductivity of hard and soft water and a brine solution to initiate and terminate the operation of regenerating the softening material.

Another object of the invention is the provision of the predetermined volume of salt solution for regenerating the softening medium.

The invention is hereinafter more fully described and claimed.

In the accompanying drawings forming a part of this specification.

Figure 1:
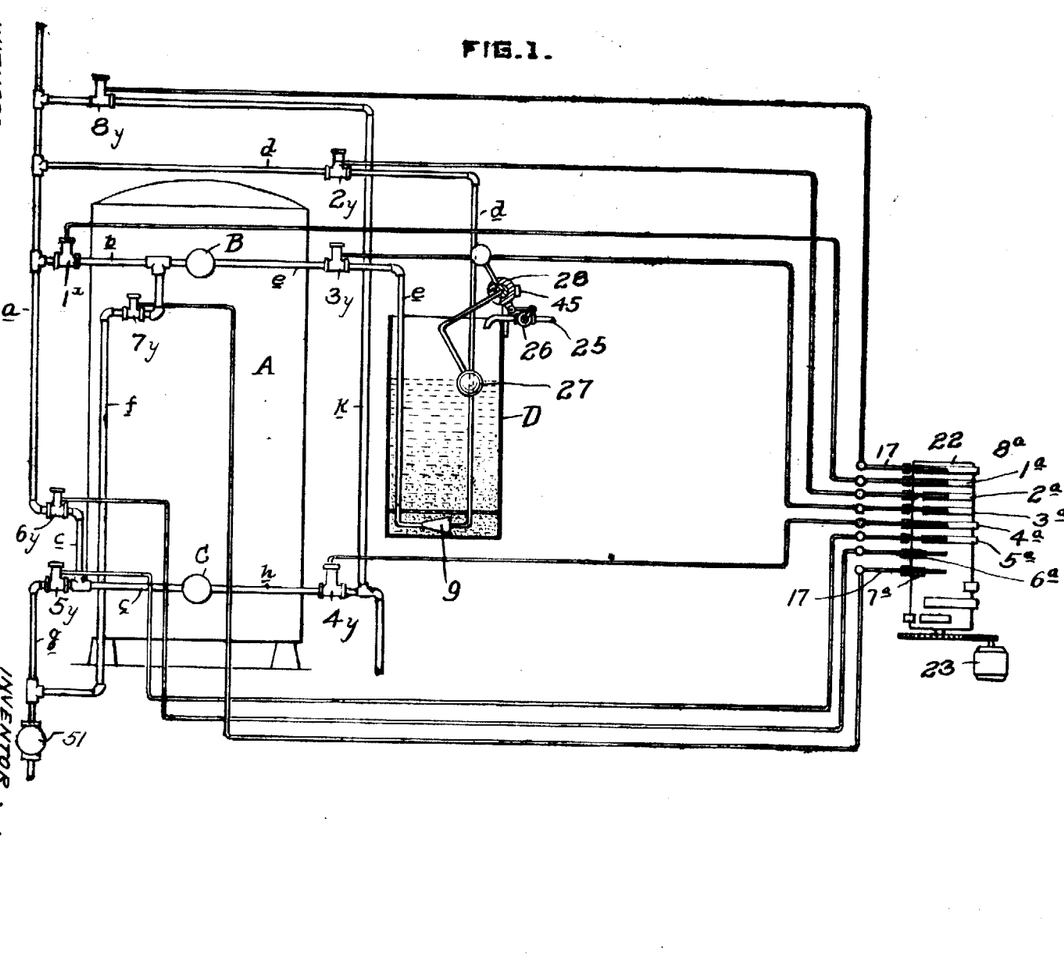
Fig. 1 is a diagrammatic view showing a drum with means for operating the governing valves and connections from such valves to valves controlling the flow of water to and from the treating and brine tanks.

The shell or drum A containing the softening material, as for example zeolite, is provided with upper and lower nozzles B and C arranged respectively above and below the material in the shell. The water supply pipe $a$ is connected by branches $b$ and $c$ to the nozzles, said branches being provided with valves $1x$ and $6y$. A branch pipe $d$ extends from the supply pipe $a$ to the tank D containing the regenerating material, e. g. a body of salt, and is provided with a valve $2y$. The regenerating tank is connected by a pipe $e$ having a valve $3y$ to the upper nozzle B. A pipe $f$ having a valve $7y$ is connected to the branch $b$ at a point intermediate the valve $1x$ and the nozzle B and extends to a pipe $g$ leading to a drain. A pipe $h$ having a valve $4y$ conducts softened water from the lower nozzle C to the point of use.

When the material in tank A is in operative condition, the cycle of operation will be such that water will flow from the supply pipe $a$ through $b$, the valve $1x$ being open, through nozzle B down through the tank A, out through the lower nozzle C, and thence by pipe $h$ to the point of use controlled by the valve $4y$. During the softening period, all the valves above mentioned, except $1x$ and $4y$ are closed. After the material has become ineffective, indicated by the water becoming hard, the valves $1x$ and $4y$ are closed, and valves $6y$ and $7y$ are opened so that water will flow from supply pipe $a$ through branch pipe $c$ up through the material and from the top nozzle B through pipes $f$ and $g$ to a drain.

By this backwashing operation, the material in the tank is loosened up and mechanically cleaned.

The next step in the cycle of operations is to regenerate the material in the tank. During the softening operation, the water hardening elements, i. e., lime and magnesium, were eliminated by the substitution of sodium therefor, and in regeneration, salt water is passed through the material to permit of the replacement of the lime and magnesium sodium. To effect this regeneration, valves $6y$ and $7y$ are closed and valves $2y$, $3y$ and $5y$ opened, thereby permitting the flow of water from the supply pipe $a$ through the pipe $d$ into the tank D containing a strong brine. It is preferred that the brine should be mingled with the stream of water entering through pipe $d$ and for that purpose the end of pipe $d$ projects a suitable distance into the open end of a cone 9 which has its smaller end connected to pipe $e$ leading to upper nozzle B of tank A. The salt water flows down through the material in the tank and escapes through lower nozzle C, branch $c$ and pipe $g$ to a drain.

The final step in the cycle consists in the removal of the brine water from the zeolite in tank A. To this end, valves $2y$ and $3y$ are closed and the valve 1x opened so that water will flow from the supply pipe a through branch pipe b, nozzle B, down through the material in tank A, then out through lower nozzle C, branch pipe c and pipe g to drain. After the brine has been washed out, valve 5y is closed, and valve 4y in pipe h leading to point of use is opened so that softened water will begin to flow to the point of use.

It will be observed that during the backwashing, regenerating, and the operation of removing salt resulting from regeneration, valve 4y in the pipe leading to the point of use is closed and although the time consumed in these several operations is short, it may be undesirable to prevent the flow of water to the point of use. Hence a by-pass is provided consisting of a pipe K leading from the supply pipe a and connected to the delivery pipe h at a point outside of valve 4y. This pipe is provided with a normally closed valve 8y which is opened at the time valves 1x and 4y are closed at the end of the softening period as hereinbefore stated.

Provision is made for the automatic operation of the control valves 1x and 2y to 8y inclusive at the beginning and end of each step of the cycle of operations above described, so that such operations shall occur in proper sequence and the proper duration of each operation properly determined.

Figure 5:
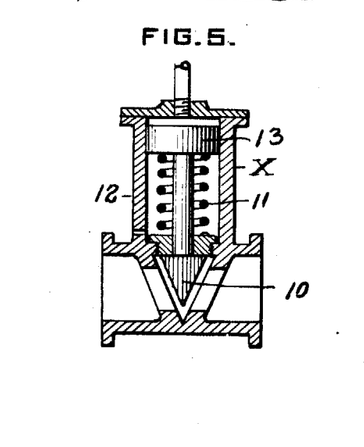
Figs. 5 and 6 are sectional views showing respectively constructions of controlling valves.
Figures 6, 7:
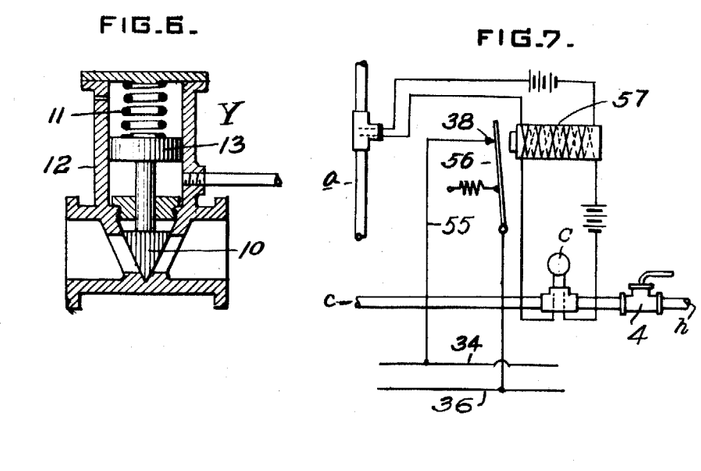
Fig. 7 is a diagrammatic view illustrating means for initiating the regenerating operation as the softening material becomes ineffective.

While any suitable construction of valves may be employed, it is preferred that the valves should be so constructed as to be held in normal position (open or closed) by springs, and to be shifted from normal preferably by fluid pressure, as for example, the pressure of the water in the system. The normal position of the respective valves is that occupied for the longer period. As for example, the softening period is longer than any of the other periods described above and since valves 1x and 4y are open during this period and the other valves closed, the valves 1x and 4y are constructed as shown in Fig. 5 and the other valves as shown in Fig. 6. In the construction shown in Fig. 5, the movable member 10 of the valve mechanism is held normally in open position by a spring 11 bearing at one end against the end of a cylinder 12 and at the opposite end against a piston 13. The closure of the member 10 is effected by fluid pressure admitted above piston 13. In the construction shown in Fig. 6, spring 11 is interposed between one end of the cylinder and the upper face of piston 13 and fluid pressure is admitted between the piston and the inner end of the cylinder, whereby the member 11 may be shifted from its normally closed position by fluid pressure opposing the action of the spring.

Figures 2, 8, 9:
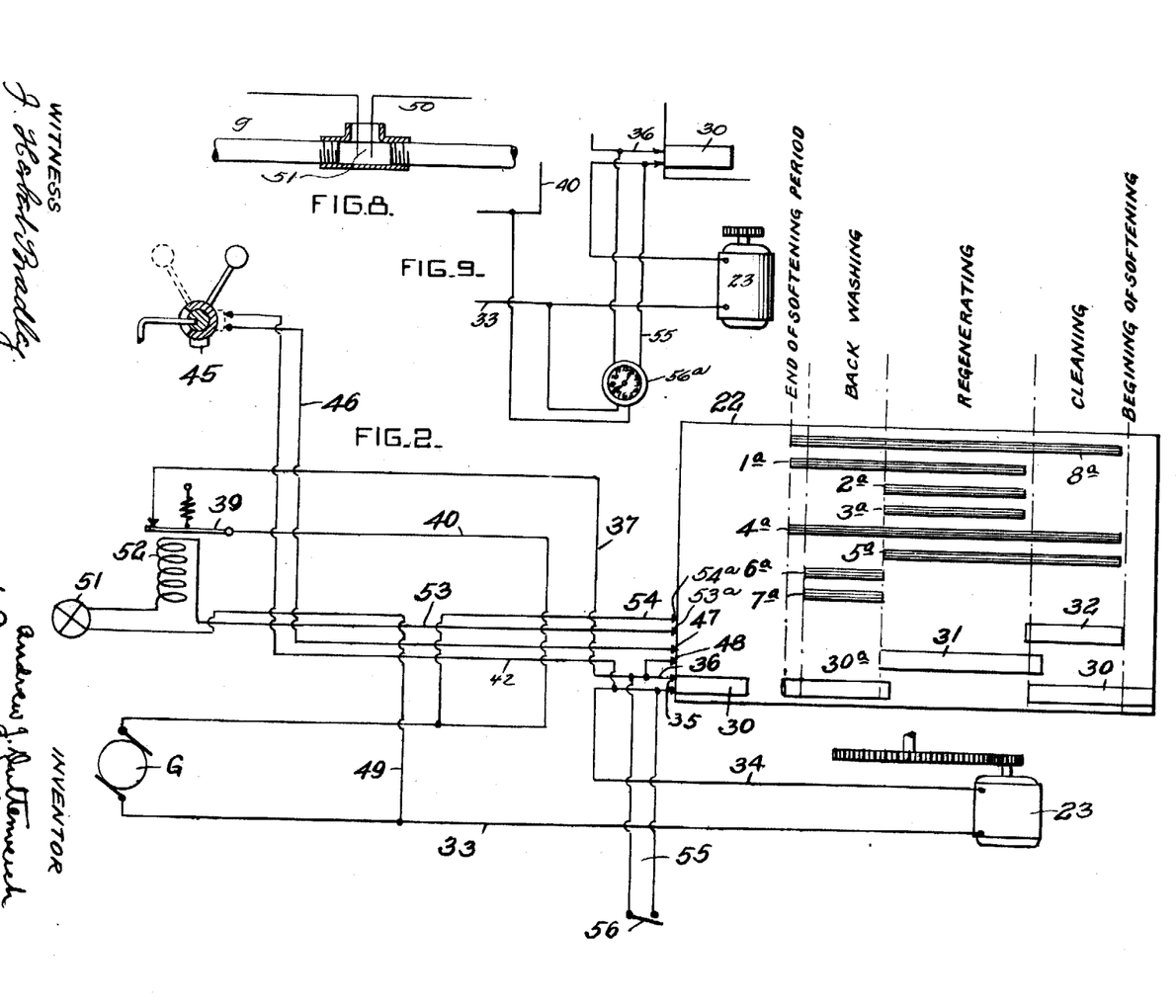
Fig. 2 is a diagrammatic view showing a plane development of said drum and circuits controlling the operation of the motor operating the drum.
Fig. 8 is a sectional view illustrating a make and break mechanism in the pipe leading to the drain.
Figure 9 a diagrammatic view showing a portion of the circuit of Figure 2 with a time-clock substituted for the time switch.
Figure 4:
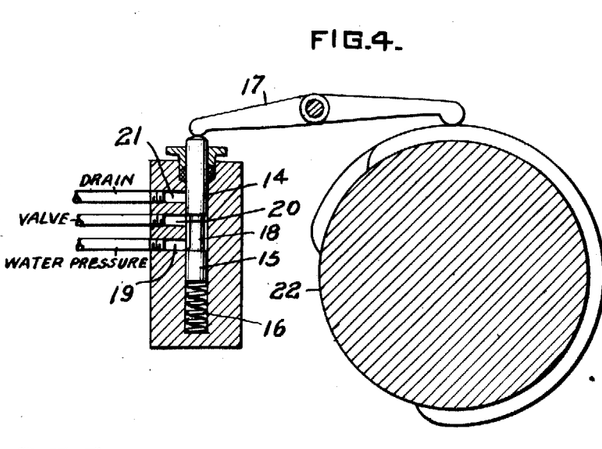
Fig. 4 is a sectional elevation of mechanism for operating the governing valves.

Each of the valves 1x and 2y to 8y inclusive is connected by a pipe line to a pilot valve mechanism, such for example as that shown in Fig. 4. This valve mechanism consists of a cylinder 14 in which is arranged a pilot valve 15 which is normally biased by a spring 16 to a raised position and adapted to be depressed by a lever 17. The plunger is provided with a constricted portion 18 adapted to connect any two of the ports 19, 20 and 21 of cylinder 14 while the third port is closed. The port 19 is connected to a source of fluid pressure, port 20 to a valve mechanism such as valve 1x, 2y to 8y and port 21 to a drain. Levers 17 are actuated to depress pilot valve 15 by cam-like projections 1a to 8a inclusive on drum 22 which is adapted to be rotated by any suitable means as an electric motor 23 (Figs. 1 and 2). The operation of this motor is controlled in a suitable manner preferably by automatic means to rotate the drum so that the several valves 1x, 2y to 8y will be controlled by their respective pilot valves through cams 1a to 8a in such combination and sequence that the several described operations will be initiated and maintained for a suitable period.

In describing the operations of the valve controlling devices, it will be assumed that the softening period has terminated during which the motor is stopped, and it becomes necessary to backwash, regenerate, and eliminate the brine. It will be understood that all the valves, 1x and 2y to 8y inclusive, controlling the flow of liquid to and from tank A are in normal position, except when the levers operating the respective pilot valves are in engagement with the cams on drum 22. And further, it should be borne in mind that the valves 1x and 4y are normally in open position, while all the other controlling valves, i. e., 2y, 3y, 5y, 6y, 7y and 8y are normally closed.

After the proper pilot valves have been actuated for effecting the softening operation, the drum is stopped and the cam followers of levers 17 cooperating with the pilot valves 15 that control valves 1x, 4y and 8y, rest on the drum 22 adjacent cams 1a, 4a, and 8a. In this position of the drum the levers employed for shifting the pilot valves governing the application of fluid pressure to the control valves 6y and 7y are adjacent cams 6a and 7a. When these several cams shift their respective levers, valves 1x and 4y will be closed, stopping the flow of water through the softening material to the point of use, but opening valve 8y to permit the flow of hard or non-treated water to the point of use. At the same time valves 6y and 7y are opened to permit a reverse flow of water through tank A for backwashing the material. The cams 6a and 7a are made of a length dependent on the desired duration of the backwashing. As cams 6a and 7a pass from under their levers 17, the pilot valves corresponding to valves 6y and 7y will be closed by their springs 16, and valves 6y and 7y will be moved by their springs to normal or closed position.

As the valves 6y and 7y are closed, cams 2a, 3a, and 5a pass under their levers 17 to shift the pilot valves controlling valves 2y, 3y and 5y to bring the latter to their open position, thereby permitting water to flow through the brine tank D thence down through the material in tank A and out through the drain.

The cams 2a, 3a and 5a are made of such lengths relative to the rate of rotation of the drum as to insure a flow of brine through the material in the tank A for a sufficient time to effect the regeneration of the material. When cams 2a and 3a pass from under their levers 17 valves 2y and 3y will be closed, but as cam 5a controlling valve 5y extends further around the drum than cams 2a and 3a, the valve 5y will be held open after valves 2y and 3y are closed. Immediately following the closure of valves 2y and 3y, cam 1a will pass from under its lever controlling valve 1x, causing the latter to open and water to flow from the source of supply to the top of tank A down through the softening material to remove the brine and escape through lower nozzle C, branch pipe c and pipe g to the drain.

On the continued movement of the drum 22, cams 5a, 4a, and 8a will pass from under their respective levers causing valves 5y and 8y to close, the latter being in the by-pass k and at the same time open valve 4y permitting water to flow into the top of tank A, the valve 1x having been previously opened. With the valves in this position, softened water will flow to the point of use. It will be understood that cam 8a is made of such length and so located as to keep the by-pass valve 8y open from the termination of the softening period to the completion of the flushing out operation.

It is preferred that salt should be fed to tank A in approximately measured quantities, preferably by the employment of a tank adapted to be automatically charged after each regenerating operation. A convenient construction to that end consists of a tank D having a capacity somewhat greater than that necessary to supply the quantity of brine for each regeneration.

Figure 3:
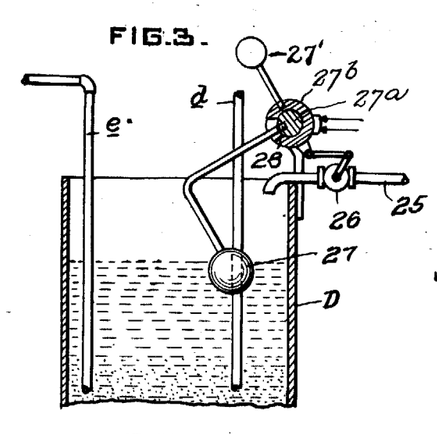
Fig. 3 is a sectional detail view of the brine supply tank and means controlling the flow of water to the tank.

This tank is charged with a suitable quantity of water supplied by a pipe 25 provided with a valve 26 adapted to be shifted to open and closed positions by changes of level of the liquid in the tank.

A convenient means to that end is shown in Figs. 1, 2 and 3 and consists of a float 27 attached by a bent rod to a rotatable shaft 27a on which is rotatably mounted a sleeve 27b, the rod passing through a slot in the sleeve. The sleeve is connected to the stem of the valve 26 in the water supply pipe 25 to shift the same to open and closed positions as the float is shifted on changes of level of water in the tank D. The slot in the sleeve is made of such length that the float can move intermediate the desired upper and lower levels of the liquid in the tank without shifting the sleeve, but as the float approaches such levels its rod will bear against one or the other of the shoulders 28 formed in the construction shown by the end walls of the slot in the sleeve and turn the sleeve such distances as will shift the weighted arm 27' to a position where it will automatically effect such further movement of the sleeve as to open or close valve 26.

It will be observed that a complete cycle of the operations consists of (a) the end of the softening period; (b) backwashing; (c) regeneration; (d) cleaning; and (e) beginning of softening period. These several cycles are indicated by the dotted lines running transversely of the cams 1a to 8a inclusive, on the portion of Fig. 2 illustrating a development of drum 22. Referring to Fig. 2 the drum operating motor 23 is connected to a source of electrical energy such as a generator G through a conductor 33, a conductor 34, terminal brushes 35 contacting with conductor segments 30 and 30a mounted on the drum, a conductor 36 leading to a movable armature 39, and a conductor 40, leading to the generator.

The motor 23 is open circuited during the softening period, by the gap between the drum contact segments 30 and 30a, and in order to start the operation of the motor and drum at the end of the softening period, provision is made for closing said circuit by a by-pass circuit 55 connecting conductors 35 and 36 and adapted to be closed by any convenient means, as a hand operated switch 56 but preferably automatic as will be hereinafter set forth.

On the starting of motor 23 by the closing of switch 56, the pilot valve levers 17 operating valves 1x and 4y will disengage cams 1a and 4a and the pilot valve will operate to close valves 1x and 4y. At the same time, the levers for operating the pilot valve of valve 8y will be actuated by cam 8a causing the raw water to by-pass the softening tank A and flow to the point of use. Immediately following the closing of the valves 1x and 4y the proper pilot valve levers will pass onto cams 6a and 7a, thereby opening the valves 6y and 7y to permit backwashing and loosening up of the material in tank A. This backwashing operation continues for a suitable length of time, determined by the rate of rotation of the drum and the length of the cams 6a and 7a. Cams 2a, 3a and 5a will then operate the proper levers to open valves 2y, 3y and 5y permitting the flow of brine from tank D to the upper nozzle B of the water softening tank.

It will be understood that before valves 2y, 3y and 5y are opened, valves 6y and 7y will be closed; that subsequent to the opening of valves 2y, 3y and 5y, the brushes of the circuit above described will pass off contact strip 30a, breaking that circuit. At the same time brushes 47 and 48 of a make and break circuit will pass onto a contact segment 31 of the drum 22. The circuit including these latter brushes consists of (starting with the generator G) the conductor 33, motor 23, conductors 34, 42, make and break mechanism 45, conductor 46, brush 47 and contact segments 31, from the second brush 48 by conductor 37, armature 39, conductor 40 to generator G. The passing of the contacts of the first circuit from the strip 30a will break said circuit and the motor will stop, and although the contacts for the strip 31 bear on the latter before the other contact brushes pass off the strip 30, no current can flow through the motor for the reason that the circuit including the strip 31 is broken at the make and break mechanism 45.

By the opening of the valves 2y, 3y and 5y, brine will begin to discharge from tank D into the regenerating tank A and will continue to discharge until the cams 2a and 3a pass from under the levers controlling valves 2y and 3y. Just prior to the opening of valves 2y, 3y, and 5y, cams 6a and 7a pass from under the levers controlling the valves 6y and 7y pertaining to the backwashing, terminating such backwashing operation. As hereinbefore stated, some considerable time is required for regeneration, and hence provision is made for stopping the operation of drum 22 before cams 2a and 3a pass from under their levers 17. This stopping of the operation of drum 22 is due to the breaking of the first circuit described to the motor by the passing of the brushes over the strip 30a and also to the open position of the make and break mechanism 45 in the circuit included in contact strip 31.

As the brine drops down in the brine tank, the float therein will gradually move down and the weight for operating the make and break mechanism will be shifted towards a vertical position and will pass beyond such vertical position just about the time the desired quantity of brine has passed from tank D, whereupon the weight will flop over and close the make and break mechanism 45, as indicated in Fig. 2, and at the same time open valve 26 to permit water to flow into the tank containing the regenerating material.

The closure of the make and break circuit will permit the starting up of motor 23 to move cams 2a and 3a from under their levers which control the valves 2y and 3y, and also the movement of cam 1a from under its lever which controls valve 1x, so that the latter will be opened. By the opening of valve 1x, valve 5y remains open since cam 5a is still under the lever, and water will flow from the supply line a down through the material to wash out the brine and be discharged through the drain.

Following the movement of cams 1a and 2a and 3a from under their respective levers to stop the flow of brine and open the valve 1x for the cleaning, or flushing operation the brushes will pass from strip 31 and brushes 53a and 54a of conductors 53 and 54 will pass onto the contact segment 32. The circuit of the segment 32 consists of (starting at the generator) the conductor 33, conductor 49, make and break device 51, relay coil 52, conductor 53, to the brush 53a through the segment 32, brush 54a, conductors 54 and 40 to the generator. The make and break device 51 consists, as shown in Fig. 8, of a pair of spaced conductors projecting into a chamber in the drain pipe so that brine water passing through such drain pipe, as during the regenerating and part of the washing periods, will complete the circuit on account of the electrical conductivity of the brine, and the circuit first described through the motor will be broken, although the brush contacts are on the strip 30. The circuit through contact strip 32 will remain closed, and the motor circuit through contact strips 30, above described, will remain open until the water passing through the drain is free of brine whereupon the current between the terminals 51 will be broken and the armature 39 in the main motor circuit will be shifted by its spring to close the motor circuit. The motor 23 will be energized as the contacts or brushes have previously passed upon the strip 30, so that the drum will be operated to close the valve 5y and open the valve 4y in order that water may flow through the material and be softened. The drum 22 will continue to operate until the brushes of the main circuit reach the gap between the sections of the strip 30. It should be stated that simultaneous with the opening of the valve 4y, the valve 8y in the by-pass is closed.

In order that the motor may be started at the end of the softening period, a shunt 55, Fig. 2 is provided which may be closed by a switch of any suitable construction, such as a knife switch as indicated at 56, until the brushes make contact on segment 30a. Where the use of water is approximately uniform, regeneration can be effected at regular intervals and in such case a clock 56a, Figure 9, can be employed for operating the shunt switch 56. Where the use of the water is irregular, it is preferred to operate the starting switch by and in accordance with the changes in the character of the water after it has passed through the tank A. As is well known, the electrical conductivity of water varies with the character of the water, i. e., whether hard or soft, and advantage is taken of such relative conductivity of water before and after softening, to close the circuit through the motor.

A convenient construction to that end is shown in Fig. 7 and consists of an electro-magnet 57 having oppositely wound coils, one coil having its terminals extending into the water flowing through the supply pipe a and the terminals of the other coil extending into the stream of softened water flowing from the tank. These coils are so constructed and the gaps between the terminals in the respective pipes so proportioned, that when the water is being properly softened, one of these coils will have a greater field strength than the other, and the armature 56 of the electro-magnet which forms or controls the shunt circuit 55, will be drawn from its contact point 38 and the shunt circuit will be normally open. As soon as the water flowing from the tank becomes hard, the currents through the coils will neutralize each other and the armature will be shifted to close the shunt circuit 55, and the motor 23 will be energized to operate.

Briefly reviewing the operation of the water softening system it is necessary to bear in mind that the apparatus comprises a tank A containing the water softening agent, a tank D for the brine solution with which the softening agent is regenerated; that the latter is connected to the inlet passage B of tank A and to the source of raw water so that the raw water may be conducted through the tank D for the purpose of picking up the brine and conducting it to the tank A through the inlet passage B. Tank A is also connected direct to the raw water supply at its inlet passage B and its outlet passage C and the latter passage is further connected to the point of use. A by-pass connection from the source of raw water direct to the connection leading to the point of use provides a supply of water for use when for any reason the tank A is disconnected from the line. The connections between tanks A and B, the raw water supply, and the point of use above referred to, are severally provided with control valves 1x, 2y to 8y inclusive of which 1x and 4y are normally open as illustrated in Fig. 5, and 2y to 8y inclusive, excepting 4y, are normally closed down as illustrated in Fig. 6. These valves are severally controlled by pilot valve mechanism illustrated in Fig. 4 which are operated by a series of cams mounted on the drum 22 that is rotated by the motor 23.

The operation of the main control valves is graphically illustrated in Fig. 2 of the drawings in which the drum 22 is projected and marked off to designate the several operations of softening, backwashing, regenerating and cleaning or flushing, which constitute a complete cycle of operation that is repeated by the continuous rotation of the drum, but which is interrupted to allow a sufficient period of time to complete the several operations mentioned.

The strips 1a to 8a inclusive, diagrammatically illustrate the cam members operating the levers 17 of the pilot valves and they are numbered to correspond with the numbering of the main control valves 1x, 2y to 8y inclusive. The drum 22 is further provided with contact segments 30—30a—31 and 32 which engage brushes of the motor control circuit and constitute the drum type of controller or rotary switch. The segments are so spaced, and adapted to open and close the motor circuit in such manner that rotation of the drum is interrupted at certain intervals as will be hereinafter explained. Again referring to the diagrammatic view of drum 22, Fig. 2, assuming that the relative position of the contact segments of the drum and the brushes of the motor circuit is such that no contact is made, this being the position where the gap between the contact segments 30 and 30a is in alinement with the brushes. In this position none of the cams is effective in operating the pilot valves and accordingly the valves 1x, 2y to 8y inclusive, are in their normal position, that is, valves 1x and 4y are open and the remaining valves are closed in the manner illustrated in Figs. 5 and 6 respectively.

In this position of the valves the water softening apparatus functions to conduct the raw water supply from the pipe line a to the inlet passage B, thence through the zeolite or softening agent in tank A from which it passes through outlet C, line h, valve 4y which is open, to the point of use. So long as the character of the softened water coming out of tank A is such as to bias the electro-magnet 57 illustrated in Fig. 7, to hold the movable armature 56 away from its contact 38, the motor 23 will remain idle because of its circuit being open, but when the zeolite or softening agent in tank A is no longer effective in softening water passing from the outlet passage C, the electro-magnet 57 will be balanced as previously explained and the movable armature 56 will be released and because of its bias by a spring, will contact at 38 to close the motor circuit whereby motor 23 is energized and the drum 22 rotated.

Upon the initial rotation of drum 22 the motor circuit will be established through the contact segment 30a and cams 1a, 4a, and 8a will engage their respective levers which in turn manipulate the pilot valves corresponding to valves 1x, 4y and 8y closing the valves 1x and 4y and opening valve 8y, whereby raw water is no longer passed through the softening tank by way of the inlet passage B, but raw water is conducted through the line k to the point of use. Upon further movement of the drum 22, cams 6a and 7a, controlling valves 6y and 7y become active and their corresponding pilot valves open the valves 6y and 7y causing a flow from the supply line a through the outlet passage C of tank A upwardly through the regenerating material out at the inlet passage B, and down through the line f to the drain. This flow is continued during the period in which the cams 6a and 7a contact with their levers which is designated the backwashing period in the diagram of Fig. 2, and during the same period the motor circuit is maintained through contact of brushes with the contact segment 30a.

At the end of the backwashing operation or period, the motor circuit is established through contact of brushes 47 and 48 with the segment 31 of the drum. Cams 6a and 7a become inactive whereby valves 6y and 7y assume their normally closed positions; cams 2a 3a and 5a pass under their respective levers to operate the pilot valve controlling the valves 2y, 3y and 5y, whereby a supply of water is conducted through line A, through the brine tank D picking up the brine solution inside of cone 9, carrying it through the line e to the inlet passage B of tank A from which it is passed downwardly through the zeolite to regenerate the same and thence passes out of the tank at outlet C through line c to the drain.

At the beginning of the regenerating operation at the instant contact is broken with strip 30a and made on the segment 31, the motor becomes open circuited by virtue of the make and break mechanism 45 which is open or broken when the brine tank D is full of brine by virtue of float 27 which maintains the weighted arm in the upward position as shown in Fig. 2. Accordingly, the drum 22 will not rotate until contact is established by the make and break device 45. This is accomplished when a predetermined amount of brine solution has passed out of tank D by virtue of the float dropping and tilting the weighted arm to the position shown in dotted lines in Fig. 2 in which position the circuit comprising the conductors 42 and 46 is closed and motor 23 becomes energized. The subsequent rotation of the drum maintains the valves 2y, 3y and 5y in their operative position for regenerating and when brushes 53a and 54a contact with the drum segment 32, the regeneration of the zeolite is completed and at the same time brine will flow through the drain thus short circuiting the electrodes 51 whereby coil 52 becomes energized and opens the motor circuit by withdrawing the movable armature 39 from its contact. Valve 1x will then be open and valves 2y and 3y will be closed and since the valve 5y is retained in its open position, water will flow from the supply line a through line b in intake passage B through the tank A and out at passage C to the drain to flush the zeolite, this being termed the cleaning operation. When all the brine solution has been flushed out of tank A and the water passing through the drain is of such character as to open circuit at electrodes 51, the motor circuit will be again established by the closing of the movable armature 39 with its contact and drum 22 will rotate until the brushes of the motor circuit reach the gap between segments 30 and 30a. During this final operation cams 8a, 4a and 5a will disengage the operating levers controlling their respective pilot valves whereby the normal position of all of the control valves 1x, 2y to 8y inclusive, is again established. In this position of the brushes and contact segments the motor is deenergized and valves 1x and 4y being in their normal open position, raw water will flow from the supply line a through inlet passage B, through the softening agent in tank A, out at passage C, and to the point of use, this being the softening period of the system and this position of the apparatus is maintained until the character of the water passing out of the tank A is such as to close the motor circuit controlled by the electro-magnet 57 illustrated in Fig. 7.

The several functions as effected by the control of valves 1x, 2y to 8y and the make and break of the motor circuit through the contact segments of the drum can best be understood by the diagrammatic showing of the cams and contact segments in Fig. 2 of the drawings in which the operation of the several valves can be readily followed by the relative positions and lengths of the cams and contact segments. It will be understood from an inspection of the cams in Fig. 2 that cams 4a and 8a are active during the entire period of backwashing, regenerating and flushing to control valves 4y and 8y which prevents the flow of unclean or salty water from tank A to the point of use and maintains a constant supply of raw water during the backwashing, regenerating and flushing operations.

It is evident from the foregoing description of my invention that water softening apparatus as described therein provides a fully automatic operating system for carrying out the several operations of softening, backwashing, regenerating and flushing in their proper sequence, that such operations are in the first instant initiated by the change in the character of the water passing out of the softening tank and that they are terminated by the passing of fresh water through the drain. The system further provides for conducting a predetermined amount of brine solution to the softening material and to automatically reestablish the brine supply.

Although I have described one embodiment of my invention, it will be obvious to those skilled in the art that various modifications may be made in the design and arrangement of the several cooperating parts without departing from the principles herein set forth.

I claim:

1. In a water softening apparatus, a tank containing a softening material, a tank containing material for regenerating the softening material, a system of piping therefor, means controlling the flow through said piping, and a time clock controlling said means to initiate regeneration of the softening material at predetermined intervals.

2. In a water softening apparatus comprising electrically controlled means for effecting the regeneration of the water softening material, means controlled by the difference between the electrical conductivity of softened water and the electrical conductivity of hard water to cause the operation of said electrically controlled means.

3. In a water softening apparatus comprising a container for water softening material, electrically controlled means for effecting the regeneration of said water softening material, a circuit and a circuit breaker and closer for said circuit, an electrically operated device to control the said circuit breaker and closer and comprising a circuit, and two electrodes connected in said circuit, extending into water which has passed through said water softening material and spaced one from the other.

4. In a water softening apparatus, a container for water softening material, electrically operated means for effecting the regeneration of said water softening material, a circuit and a circuit breaker and closer for said circuit, an electromagnet to control said circuit breaker and closer, and a circuit for said magnet comprising two electrodes spaced apart and extending into water which has passed through said water softening material.

5. In a water softening apparatus, the combination with a zeolite container, a brine tank, and conduits for passing water through said container and for delivering brine from said tank into said container, control valves disposed in said conduits, a motor operatively connected to said valves for actuating the same, and electrical means for periodically operating said motor comprising a switch operatively connected to said motor and a motor control circuit including said switch, said switch and circuit being arranged to stop said motor upon the operation of said motor for a predetermined period.

6. In a water softening apparatus, the combination with a zeolite container, a brine tank, and conduits for passing water through said container and for delivering brine from said tank into said container, control valves disposed in the several conduits, a valve operating shaft, cams operable by said shaft to actuate said valves, a motor operatively connected to said shaft for turning the same, and electrical means for periodically starting and stopping said motor comprising a rotary switch element connected to said shaft, a motor control circuit including said element, a contact arranged in said circuit to coact with said element in opening and closing said circuit, a starting switch and another circuit, including said starting switch, adapted to shunt said element and contact.

7. In water softening apparatus, the combination with a zeolite container, a brine tank, and conduits for passing water through said container and for delivering brine from said tank into said container, control valves disposed in the said conduits, a shaft, cams operable by said shaft to actuate said valves, a motor operatively connected to said shaft for turning the same, and electrical means for periodically operating said motor comprising a rotary switch operatively connected to said shaft and a motor control circuit including said switch, said switch and circuit being arranged to stop said motor upon the turning of said shaft through a predetermined angle.

8. In a water softening apparatus, the combination with a zeolite container, a brine tank, and conduits for passing water through said container and for delivering brine from said tank into said container, control valves disposed in the several conduits, a motor operatively connected to said valves for actuating the same, and electrical means for periodically starting and stopping said motor comprising a switch element movable by said motor, a motor control circuit including said element, a contact arranged in said circuit to coact with said element in opening and closing said circuit, a starting switch and another circuit, including said starting switch, adapted to shunt said element and contact.

9. In a water-softening apparatus comprising means for effecting regeneration of the water-softening material, means controlled by the degree of hardness of the water delivered by said softener to control the operation of said regenerating means.

10. In a water softening apparatus, a container for water softening material having inlet and outlet passages, a flow system adapted to establish flow connections between said inlet and outlet passages and a source of regenerating material, a drain, a point of use, and a source of water supply, valve means in said flow system controlling the flow through said system and adapted to interrupt the flow from the container to the point of use, establish flow to the drain, and to connect the source of regenerating material with said container, operating mechanism for said valve means including an electrical energizing circuit and a switch therefor, and means rendered operable by a change in character of the fluid passing from the softening material to control the switch of said circuit.

11. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain, and to cause flow from the source of regenerating material through the container to the drain, operating mechanism for said valve means, an actuator for said operating mechanism, a control means rendered operative by said mechanism upon energization of said actuator to terminate the operation of said actuator and control means operative by the fluid flowing from the container to the drain to again initiate the operation of said actuator.

12. In a water softening apparatus, a container for water softening material, a flow system adapted to establish flow connections between said container and a source of water supply, a source of regenerating material, a drain, and a point of use, operating mechanism including valve means in said flow system controlling the flow through said system, for interrupting the flow from the container to the point of use, establish flow to the drain, and to cause flow from the source of regenerating material through the container to the drain, an actuator moving said operating mechanism, and a single control element rendered operative by the fluid flowing in said system to terminate the operation of said actuator, and to again initiate the operation of said actuator.

13. In a water softening apparatus, a container for water softening material, a flow system adapted to establish flow connections between said container and a source of water supply, a source of regenerating material, a drain, and a point of use, mechanism in said flow system controlling the flow through said system, for interrupting the flow from the container to the point of use, establish flow to the drain, and to cause flow from the source of regenerating material through the container to the drain, rotatable means for operating said mechanism, electrical means for actuating said rotatable means and a control for said electrical means, said control being operative by the fluid flowing from the container to the drain to cause the electrical means to actuate the rotatable means to operate the mechanism to divert the flow from the drain to the point of use.

14. In a water softening apparatus, a container for water softening material having inlet and outlet passages, a flow system adapted to establish flow connections between said inlet and outlet passages, and a source of regenerating material, a drain, a point of use, and a source of water supply, valve means in said flow system controlling the flow through said system, operating mechanism for said valve means, an actuator for said mechanism, control means for said actuator, and means responsive to the fluid flowing in said system for connecting said actuator to a source of energy, said operating mechanism being adapted upon energization of said actuator to cause said valve means to divert the flow from the drain to the point of use, and said control means being rendered operative by said actuator to terminate the operation of said actuator when the flow to the point of use has been established.

15. In a water softening apparatus, a container for water softening material having inlet and outlet passages, a flow system adapted to establish flow connections between said inlet and outlet passages, and a source of regenerating material, a drain, a point of use, and a source of water supply, valve means in said flow system controlling the flow through said system and adapted to interrupt the flow from the container to the point of use, establish flow to the drain, and to connect the source of regenerating material with said container, operating mechanism for said valve means, an actuator for said mechanism, and means responsive to the relative hardness of the water flowing to and from said container to control said actuator.

16. In a water softening apparatus, a container for water softening material, a supply pipe for hard water having means for connecting the same with either end of said container, valves to control said connections, a service pipe connected with one end of said container, a drain pipe connected with one end of said container, valves for said drain pipe, a source of supply for regenerating solution having means for connecting the same with that end of said container opposite said drain pipe, and means controlled by the fluid flowing through said container for actuating said valves to cause water to flow through said container first in one direction and then in the other direction and for establishing the connection between said container and said source of supply for regenerating solution while the water is flowing to said drain pipe.

17. In a water softening apparatus, a container for water softening material, a supply pipe for hard water having means for connecting the same with either end of said container, valves to control said connections, a service pipe connected with said container, a drain pipe connected with said container, a valve for said drain pipe, a regenerating solution pipe connected with said container, a valve in said regenerating solution pipe, and means controlled by the fluid flowing through said container for opening and closing said valves.

18. In a water softening apparatus, a container for water softening material, a supply pipe for hard water comprising two branches connected with said container near the respective ends thereof, separate valves for the two branches of said supply pipe, a service pipe leading from one end of said container, a regenerating solution pipe connected with one branch of said supply pipe, a valve for said regenerating solution pipe, and a drain pipe connected with the other branch of said supply pipe between said container and its controlling valve, a valve to control said drain pipe, and means controlled by fluid flowing through said container for actuating said valves.

19. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, a drain pipe connected with the respective branches of said supply pipe between said container and the valves in said branches, separate valves in said drain pipe, and means controlled by the fluid flowing through said container for automatically actuating the several valves in timed relation one to the other.

20. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, drain pipes connected with the respective branches of said supply pipe between said container and the valves in said branches, separate valves in said drain pipes, and means controlled by fluid flowing through said container for automatically actuating said valves to cause the water to be softened to flow through said container in one direction during the softening operation, to cause initial wash water to flow through said container in the opposite direction and to cause regenerating solution and the final wash water to flow through said container successively in the first mentioned direction.

21. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, drain pipes connected with the respective branches of said supply pipe between said container and the valves in said branches, separate valves in said drain pipes, a motor controlled by the fluid flowing through said container, devices operated by said motor for actuating the several valves in such relation one to the other as to cause water to flow through said container in one direction during the softening operation, to cause initial wash water to flow through said container in the opposite direction and to cause regenerating solution and final wash water to flow successively through said container in the first mentioned direction.

22. In a water softening apparatus, a container for water softening material, a supply pipe comprising branches connected with said container near the respective ends thereof, separate valves for said branches, a service pipe leading from said container near one end thereof, a pipe for regenerating solution leading to said container, a valve for said regenerating solution pipe, drain pipes connected with said container near the respective ends thereof, separate valves for said drain pipes, and means controlled by the fluid flowing through said container for automatically operating the several valves in such relation one to the other as to cause water to flow through said container in one direction during the softening operation, to cause water to flow through said container in the opposite direction during an initial washing operation, to cause regenerating solution to flow through said container in the first mentioned direction during the regenerating operation and to cause wash water to flow through said container in the first mentioned direction during the final washing operation.

23. In a water softening apparatus, a container for water softening material, a supply pipe having branches connected with said container near the respective ends thereof, a separate valve for each branch of said pipe, a service pipe leading from one end of said container, a regenerating solution pipe connected with said container, a valve in said pipe, a drain pipe connected with said container, a valve to control said drain pipe, and means controlled by the fluid flowing through said container for automatically actuating said valves in such relation one to the other that will cause the liquid to flow through the container in one direction during one operation of said apparatus and to flow through said container in another direction during another operation of said apparatus.

24. In a water softening apparatus, a container for water softening material, a flow system adapted to establish flow connection between said container and a source of water supply, a source of regenerating material, a drain, and a point of use, valve means in said flow system controlling the flow through said system for interrupting the flow from the container to the point of use, establish flow to the drain, and to cause flow from the source of regenerating material through the container to the drain, rotatable valve operating means for controlling said valve means, a motor for said rotatable valve operating means, and electrical means for intermittently starting and stopping said motor comprising a rotary switch element connected to said rotatable valve operating means, a motor control circuit including said element, a contact arranged in said circuit to co-act with said element in closing and opening said circuit, a starting switch adapted to render said motor and valve operating means operative, and means controlled by fluid flowing to and from said softener for intermittently closing the starting switch.

25. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain, and to cause flow from the source of regenerating material through the container to the drain, rotatable valve operating means for controlling said valve means, a motor for said rotatable valve operating means, and electrical means for starting and stopping said motor comprising a rotary switch element connected to said rotatable valve operating means, a motor control circuit including said element, a contact arranged in said circuit to co-act with said element in closing and opening said circuit, a starting switch operative by the fluid flowing in said system, and another circuit including said starting switch adapted to shunt said element and contact.

26. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain, and to cause flow from the source of regenerating material through the container to the drain, rotatable valve operating means for controlling said valve means, a motor for said rotatable valve operating means, and electrical means for energizing and controlling said motor comprising a rotary switch connected to said valve actuating means, a motor control circuit including said switch, said switch and circuit being arranged to stop the motor upon a predetermined extent of rotative movement of said valve actuating means, and means responsive to fluid flowing in said system for establishing a circuit through said switch to start said motor.

27. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain, and to cause flow from the source of regenerating material through the container to the drain, rotatable valve operating means controlling said valve means, a motor for said rotative valve operating means, and electrical means for energizing and controlling said motor comprising a switch operably connected with said valve operating means, a second switch controlling said first mentioned switch and electric circuits including said switches, one of said switches being adapted to interrupt the operation of said motor in the regenerating period in response to fluid flowing from the container to the drain, and the other being adapted to connect the motor in circuit for further operation of the valve means.

28. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain, and to cause flow from the source of regenerating material through the container to the drain, a motor for said valve means, and electrical means for energizing and controlling said motor means comprising a switch operatively connected therewith, a circuit controlled by said switch to stop the motor means after it has moved the valve means to establish flow to the drain, and an automatic switch means and circuit controlled by the effluent to the drain to reestablish the motor circuit and thereby cause the motor means to resume its operation after cleansing.

29. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain during regenerating and cleansing operations, and to cause flow from the source of regenerating material through the container to the drain, an electric motor, a rotor operable thereby and controlling the said valve means, a motor operating circuit and control circuits therefor, said rotor having segmental contacts, and some of said circuits having terminals for connection by some of said contacts during different phases of rotation, and other control means for said control circuits operative in response to flow in said system, said rotor and circuits controlling the motor to pass the softener from normal through regenerating and cleansing operations and to restore normal operative conditions and then stop the motor.

30. In a water softening apparatus, a container for water softening material, a flow system adapted to establish flow connections between said container and a source of water supply, a source of regenerating material, a drain, and a point of use, valves in said flow system controlling the flow through said system, for interrupting the flow from the container to the point of use, establish flow to the drain, and to cause flow from the source of regenerating material through the container to the drain, a mechanism with means to operate said valves for effecting regeneration and cleansing, an electrical means for controlling said mechanism comprising a switch in operative connection therewith, a second switch under control of said first mentioned switch, electric circuits including said switches, and a control switch in one of said circuits for initiating operation of the mechanism, said first mentioned switch adapted to interrupt the operation of said mechanism after a predetermined time, and said second switch being adapted subsequently to cause operation of said mechanism after a period of rest for further operation of valves.

31. In a water softening apparatus comprising means for effecting regeneration of the water softening material, means controlled by the change in character of the fluid delivered by said softener to control the operation of said regenerating means.

32. In a water softening apparatus, comprising means for effecting regeneration of the water softening material, means controlled by the change in the electrical conductivity of the fluid delivered by said softener to control the operation of said regenerating means.

33. In a water softening apparatus, a tank containing softening material, a tank containing material for regenerating the softening material, a system of piping therefor, means controlling the flow through said piping, a motor for said means, a circuit for energizing and controlling said motor, and a time clock controlling said circuit.

34. In a water softening apparatus, a container for water softening material, a flow system adapted to establish flow connections between said container and a source of water supply, a source of regenerating material, a drain, and a point of use, valve means in said flow system controlling the flow through said system, for interrupting the flow from the container to the point of use, establish flow to the drain and to cause flow from the source of regenerating material through the container to the drain, a motor for said valve means, a source of power for said motor, means responsive to the operation of said motor for intermittently disconnecting the motor from its power source, and means operative by the fluid flowing in said system for intermittently reestablishing the connection of the motor with its power source.

35. In a water softening apparatus, a container for water softening material, a flow system adapted to establish flow connections between said container and a source of water supply, a source of regenerating material, a drain, and a point of use, mechanism in said flow system controlling the flow through said system, for interrupting the flow from the container to the point of use, establish flow to the drain, and to cause flow from the source of regenerating material through the container to the drain, an actuator for said mechanism, means for energizing said actuator, and a control means rendered operative by said mechanism upon energization of said actuator and independently of the flow in said system to terminate the operation of said actuator.

36. Apparatus for softening water comprising in combination, a container for water softening material, a system of piping connecting said container to a source of hard water supply, a source of regenerating material, a drain, and a soft water service line, valves disposed in said connections to control the flow in said system, and means for setting said valves to close the connections from the hard water supply to the container and from the container to the service line and open the connections from the source of regenerating material to the container and from the container to the drain, said valve setting means acting to simultaneously store power which upon release of the force for setting the valves automatically resets the valves to normal softening position.

37. Apparatus for softening water comprising in combination, a container for water softening material, a system of piping connecting said container to a source of hard water supply, a source of regenerating material, a drain and a soft water service line, valve means disposed in said system to control the flow of water and regenerating material to and from said container, a rotor operating said valve means and said rotor being normally set to open the valve connections from the hard water supply to the container and from the container to the service line, a motor for actuating said rotor to set the valve means to close the connections from the hard water supply to the container and from the container to the service line and open the connections from the source of regenerating material to the container and from the container to the drain, an energizing circuit for said motor and one or more electrical contacts mounted on said rotor, said contacts constituting terminals for said motor circuit whereby said circuit is broken to stop the motor when said valve means are reset for normal softening operation.

38. In a mechanism of the character described, the combination with a valve mechanism to be operated, of a meter arranged to operate as fluid is passed therethrough, an electrical device having connection with said valve mechanism for operating the same, a switch controlling the current for said device, and means controlled by said meter in response to fluid flowing therethrough for operating said switch.

39. In a mechanism of the character described, the combination with a valve mechanism to be operated, of a meter arranged to operate as fluid is passed therethrough, an electrical device having connection with said valve mechanism for operating the same, means controlled by said meter in response to fluid flowing therethrough to complete a circuit through said electrical device to operate said valve mechanism twice during each cycle of operation, and means arranged to operate during the operation of said valve mechanism to break the circuit through said electrical device when said valve mechanism has been operated a predetermined amount.

40. In a mechanism of the character described, the combination with a valve mechanism to be operated, of a meter arranged to operate as fluid is passed therethrough, an electrical device having connection with said valve mechanism for operating the same, make and break means for making and breaking the circuit through said electrical device to commence and stop the operation thereof whereby intermittently to operate said valve mechanism, means controlled by said meter in response to fluid flowing therethrough to operate said make and break device to commence the operation of said electrical device and thereby operate said valve mechanism, and means operating with the valve mechanism for operating said make and break device after a predetermined movement of said valve mechanism to stop the operation of said electrical device and halt the valve mechanism.

41. In a water softening apparatus, a container for water softening material, a flow system adapted to establish flow connections between said container and a source of water supply, a source of regenerating material, a drain, and a point of use, mechanism in said flow system controlling the flow through said system, for interrupting the flow from the container to the point of use, establish flow to the drain, and to cause flow from the source of regenerating material through the container to the drain, a motor for said mechanism, an electrical control circuit for said motor, means operative by the fluid flowing in said system for energizing said control circuit and means operative by said mechanism for de-energizing said circuit.

42. In a water softening apparatus, a treating tank having a service outlet and a waste outlet, a single valve in said waste outlet, a water supply pipe, a source of supply of brine, a clock controlled means to open said valve and keep it open for a predetermined interval of time at successive predetermined times, and means for causing a mixture of water and brine to flow through said treating tank for a fraction of each of said predetermined intervals of time and water only to flow through said treating tank during the remainder of each of said intervals of time.

43. In a water softening apparatus, a treating tank having a waste outlet and a service outlet, a single valve associated with said waste outlet, a water supply pipe, a source of supply of brine, clock controlled means to open said valve and again cause it to close after a predetermined interval of time, and means to cause a mixture of water and brine to flow through said treating tank for a fraction of said predetermined interval of time and water only to flow through said treating tank during the remainder of said predetermined interval of time.

44. In a water softening apparatus having a softening tank and a brine tank and a circulating system of piping therefor, valve means for controlling circulation from the brine tank to the softening tank, valve means controlling circulation from the softening tank, and electrically operated means responsive to the relative conductivity of the fluid flowing from the softening tank for actuating said valve means.

45. In a water softening apparatus having a softening tank and a brine tank, and a circulating system of piping therefor, valve means for controlling circulation from the brine tank to the softening tank, valve means controlling circulation from the softening tank, electrically operated means responsive to the relative conductivity of the fluid flowing from the softening tank for actuating said valve means and a switch controlled circuit for said electrically operated means.

46. In a water softening apparatus, a container for a softening means, a tank containing material for regenerating the softening means, a system of piping therefor, valve mechanism controlling the flow of fluid through said piping, electrical means for actuating said valve mechanism and means responsive to the fluid flowing through the softener for making and breaking a circuit to control the operation of said valve mechanism.

47. In water softening apparatus, a container for a softening means, a salt tank and a system of piping therefor, valve mechanism controlling the flow of a fluid through said piping, electrical means for actuating said valve mechanism and means responsive to the fluid flowing through the softener for making and breaking a circuit whereby the salting operation of the regenerating cycle is initiated.

48. In a water softening apparatus, a container for water softening material, a flow system comprising a supply pipe for hard water having constant connection with said container, a service pipe leading from said container, a drain pipe leading from said container, means for introducing regenerating solution into hard water which is delivered to said container by said supply pipe, and water controlled means in the flow system for interrupting the connection between said service pipe and said container and for establishing the connection between said drain pipe and said container while said regenerating solution is being introduced into said container.

49. In combination in a water softening apparatus, a treating tank containing a zeolite material, means for passing water to be softened through the said tank, a brine storage receptacle, a hydraulic differential control system for delivering brine to said treating tank, valve mechanism including a valve in the waste line of the brine system for producing the successive steps of salting, washing and softening, and a time measuring means controlling said valve.

50. In a water softener apparatus, a clock, electrically operated means controlled by the clock, a valve actuated by said electrical means, a tank for softening material, a tank for brine, which brine is delivered at intervals to the softening tank, a float in said brine tank for regulating the flow therefrom and means to control the replenishment of the liquid in the brine tank.

51. In a water softening apparatus comprising a container for water softening material, a soft water service pipe, a regenerating solution pipe, a drain pipe and a hard water supply pipe having connection with both ends of said container, valve means adapted to reverse the direction of the flow of hard water through said container, a motor controlled by the fluid flowing through said container, said motor being adapted to actuate said valve means to effect said reversal of flow and by the continuous operation of the motor to automatically control the duration of said reversal.

52. In a water softening apparatus, comprising a container for water softening material, a soft water service pipe, a regenerating solution pipe, a drain pipe and a hard water supply pipe having connections with both ends of said container, valve means adapted to reverse the direction of the flow of hard water through said container, a motor and means controlled by said motor to actuate said valve means to effect said reversal of flow for a period determined by the continuous operation of the motor.

ANDREW J. DOTTERWEICH.

DISCLAIMER 1,954,405.—*Andrew J. Dotterweich*, Pittsburgh, Pa. WATER SOFTENING APPARATUS. Patent dated Apr. 10, 1934. Disclaimer filed Sept. 21, 1945, by the assignee, *The Permutit Company*.
Hereby enters this disclaimer to claim 48 of said Letters Patent.
[*Official Gazette October 23, 1945.*]

brine system for producing the successive steps of salting, washing and softening, and a time measuring means controlling said valve.

50. In a water softener apparatus, a clock, electrically operated means controlled by the clock, a valve actuated by said electrical means, a tank for softening material, a tank for brine, which brine is delivered at intervals to the softening tank, a float in said brine tank for regulating the flow therefrom and means to control the replenishment of the liquid in the brine tank.

51. In a water softening apparatus comprising a container for water softening material, a soft water service pipe, a regenerating solution pipe, a drain pipe and a hard water supply pipe having connection with both ends of said container, valve means adapted to reverse the direction of the flow of hard water through said container, a motor controlled by the fluid flowing through said container, said motor being adapted to actuate said valve means to effect said reversal of flow and by the continuous operation of the motor to automatically control the duration of said reversal.

52. In a water softening apparatus, comprising a container for water softening material, a soft water service pipe, a regenerating solution pipe, a drain pipe and a hard water supply pipe having connections with both ends of said container, valve means adapted to reverse the direction of the flow of hard water through said container, a motor and means controlled by said motor to actuate said valve means to effect said reversal of flow for a period determined by the continuous operation of the motor.

ANDREW J. DOTTERWEICH.

DISCLAIMER 1,954,405.—*Andrew J. Dotterweich*, Pittsburgh, Pa. WATER SOFTENING APPARATUS. Patent dated Apr. 10, 1934. Disclaimer filed Sept. 21, 1945, by the assignee, *The Permutit Company.*

Hereby enters this disclaimer to claim 48 of said Letters Patent.

[*Official Gazette October 23, 1945.*]